United States Patent
Ha

(10) Patent No.: US 7,671,491 B2
(45) Date of Patent: Mar. 2, 2010

(54) MOVING COIL TYPE LINEAR ACTUATOR SYSTEM

(75) Inventor: Dong-Hyun Ha, Gyeongsangnam-do (KR)

(73) Assignee: Hyundai Motor Company, Seoul (KR)

( * ) Notice: Subject to any disclaimer, the term of this patent is extended or adjusted under 35 U.S.C. 154(b) by 657 days.

(21) Appl. No.: 11/517,916

(22) Filed: Sep. 8, 2006

(65) Prior Publication Data
US 2007/0241620 A1 Oct. 18, 2007

(30) Foreign Application Priority Data
Apr. 17, 2006 (KR) .................. 10-2006-0034490

(51) Int. Cl.
*H02K 33/00* (2006.01)
(52) U.S. Cl. .......................... 310/15; 310/36
(58) Field of Classification Search .......... 310/12, 310/13, 14, 15, 36
See application file for complete search history.

(56) References Cited

U.S. PATENT DOCUMENTS

| 3,816,776 | A | * | 6/1974 | Chari | 310/13 |
| 4,965,475 | A | * | 10/1990 | Kautz | 310/13 |
| 6,674,352 | B2 | * | 1/2004 | Montuschi et al. | 335/274 |
| 7,279,814 | B2 | * | 10/2007 | Patt et al. | 310/15 |

FOREIGN PATENT DOCUMENTS

| JP | 60260707 | 12/1985 |
| JP | 07-099706 | 4/1995 |
| JP | 08-107605 | 4/1996 |
| JP | 8270605 | 10/1996 |

* cited by examiner

*Primary Examiner*—Nguyen N Hanh
(74) *Attorney, Agent, or Firm*—Morgan, Lewis & Bockius LLP

(57) ABSTRACT

A moving coil type linear actuator system which can stably and linearly control a relatively large load despite using relatively low electric force applied to a coil unit, thus enhancing control accuracy and preventing energy loss.

4 Claims, 3 Drawing Sheets

MOVING COIL TYPE LINEAR ACTUATOR SYSTEM

CROSS-REFERENCE TO RELATED APPLICATIONS

The present application is based on, and claims priority from, Korean Application Serial Number 10-2006-0034490, filed on Apr. 17, 2006, the disclosure of which is hereby incorporated by reference herein in its entirety.

FIELD OF THE INVENTION

The present invention relates to moving coil type linear actuator systems and, more particularly, to a technique for an actuator system which can precisely control the movement of a load using the movement of a coil unit and magnetic force generated by supplied electricity.

BACKGROUND OF THE INVENTION

In a conventional moving coil type actuator, a coil unit is disposed between magnets, which are provided at central and outer positions in a casing. The coil unit is coupled to an actuating rod, and the actuating rod is supported by a bearing member. A load is coupled to an end of the actuating rod. When electricity is supplied to the coil unit, magnetic force lines perpendicular to electric force lines of the coil unit are formed by the magnets. Force is applied to the coil unit in a direction perpendicular to a plane containing both the magnetic force lines and the electric force lines, which are perpendicular to each other. As a result, the actuating rod is moved, thus moving the load coupled thereto.

In such a conventional moving coil type actuator, the direction in which the actuating rod is moved is changed by converting the direction of electricity applied to the coil unit. The speed at which the actuating rod is moved is controlled by adjusting the intensity of electricity applied to the coil unit.

However, in the conventional moving coil type actuator, the coil unit and the actuating rod are supported only by a bearing member disposed in the casing, so that it is difficult to maintain the distances between the coil unit and the magnets constant. Hence, when electricity is applied to the coil unit, the movement of the coil unit is unstable. As a result, movement of the coil unit and the actuating rod may be nonlinear.

Furthermore, because the load is actuated by electric force applied to the coil unit and by force generated by the magnets, a very large electric force can be required to actuate a large load.

SUMMARY OF THE INVENTION

Embodiments of the present invention provide a moving coil type linear actuator system which can stably and linearly control even a relatively large load despite a relatively low electric force being applied to a coil unit.

A moving coil type linear actuator system according to an embodiment of the present invention includes a casing. A center magnet is provided at a central position in the casing. A surrounding magnet surrounds the center magnet at a position spaced apart from the center magnet by a regular distance. A coil unit is placed between the center magnet and the surrounding magnet. The coil unit forms a flow of an electric current in a direction perpendicular to a magnetic force line, formed by the center magnet and the surrounding magnet, when electricity is applied to the coil unit. A flapper unit is coupled to the coil unit. A plurality of springs supports the coil unit and the flapper unit in the casing. A pneumatic pressure passage means adjusts an amount of compressed air, supplied from a compressed air source to a load, using movement of the flapper unit that moves along with the coil unit.

In an alternative embodiment, a center magnet is disposed centrally within a casing, a surrounding magnet surrounds the center magnet at a position spaced apart from the center magnet, and a coil unit is disposed between the center magnet and the surrounding magnet. The coil unit is linearly positionable in response to electric current applied thereto based on cooperation with the magnets. A fluid control valve is actuated by the coil unit. A pressurized fluid inlet provides pressurized fluid from a source. The fluid may be air. First and second fluid outlets are configured to act on a load in opposed directions, wherein the fluid control valve selectively pressurizes the first or second fluid outlet based on the position of the coil unit.

In a further embodiment, the fluid control valve comprises oppositely disposed air vents, one each communicating with the first and second fluid outlets, and first and second stopper blocks mounted with the coil unit. The stopper blocks are configured and dimensioned such that in a first position the first stopper block restricts the air vent communicating with the first fluid outlet and in a second position the second stopper block restricts the air vent communicating with the second fluid outlet.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, exemplary embodiments of the present invention will be described in detail with reference to the attached drawings.

Figure 1:
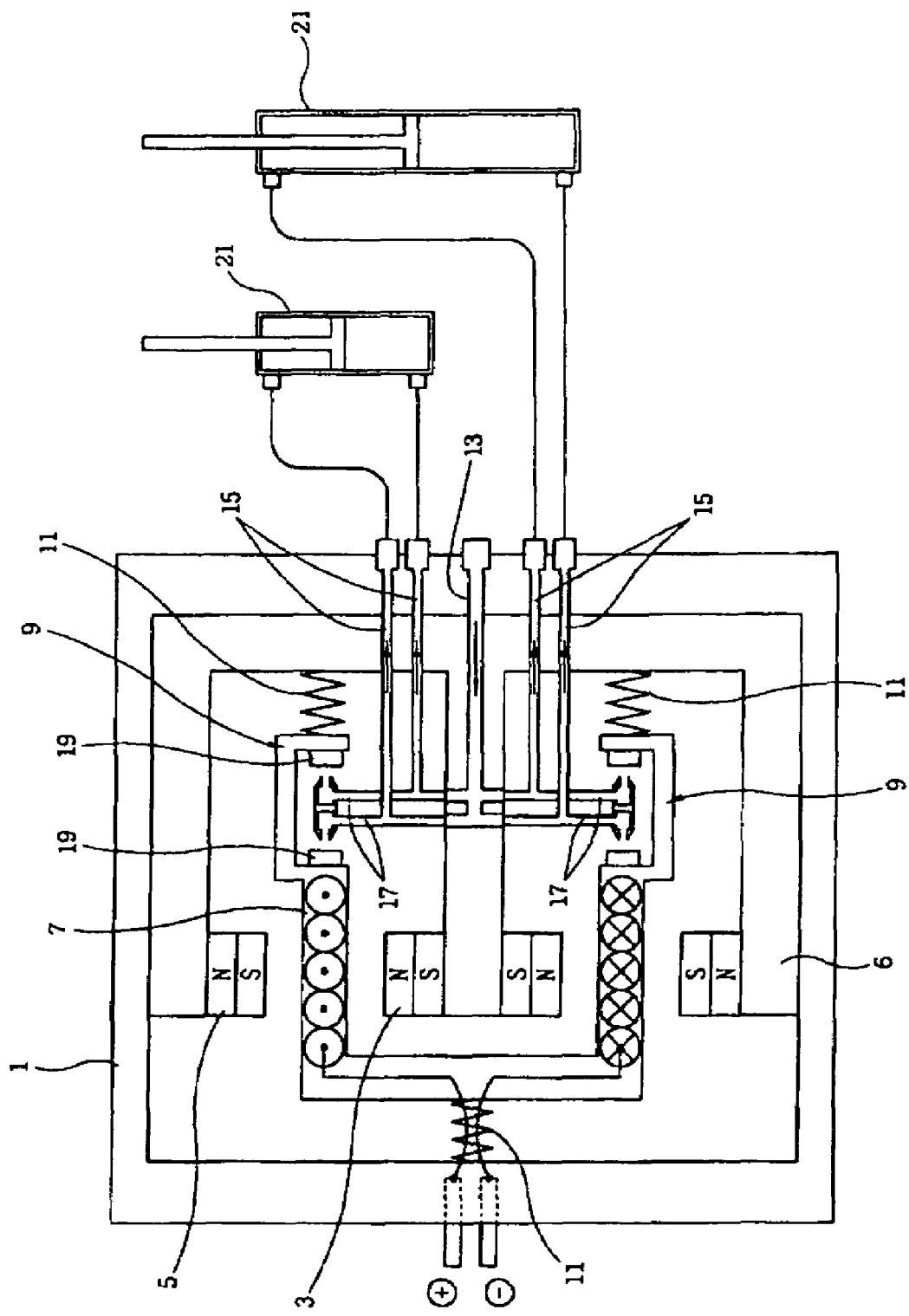
FIG. 1 is a view showing the structure of a moving coil type actuator system, according to an embodiment of the present invention.
Figure 2:
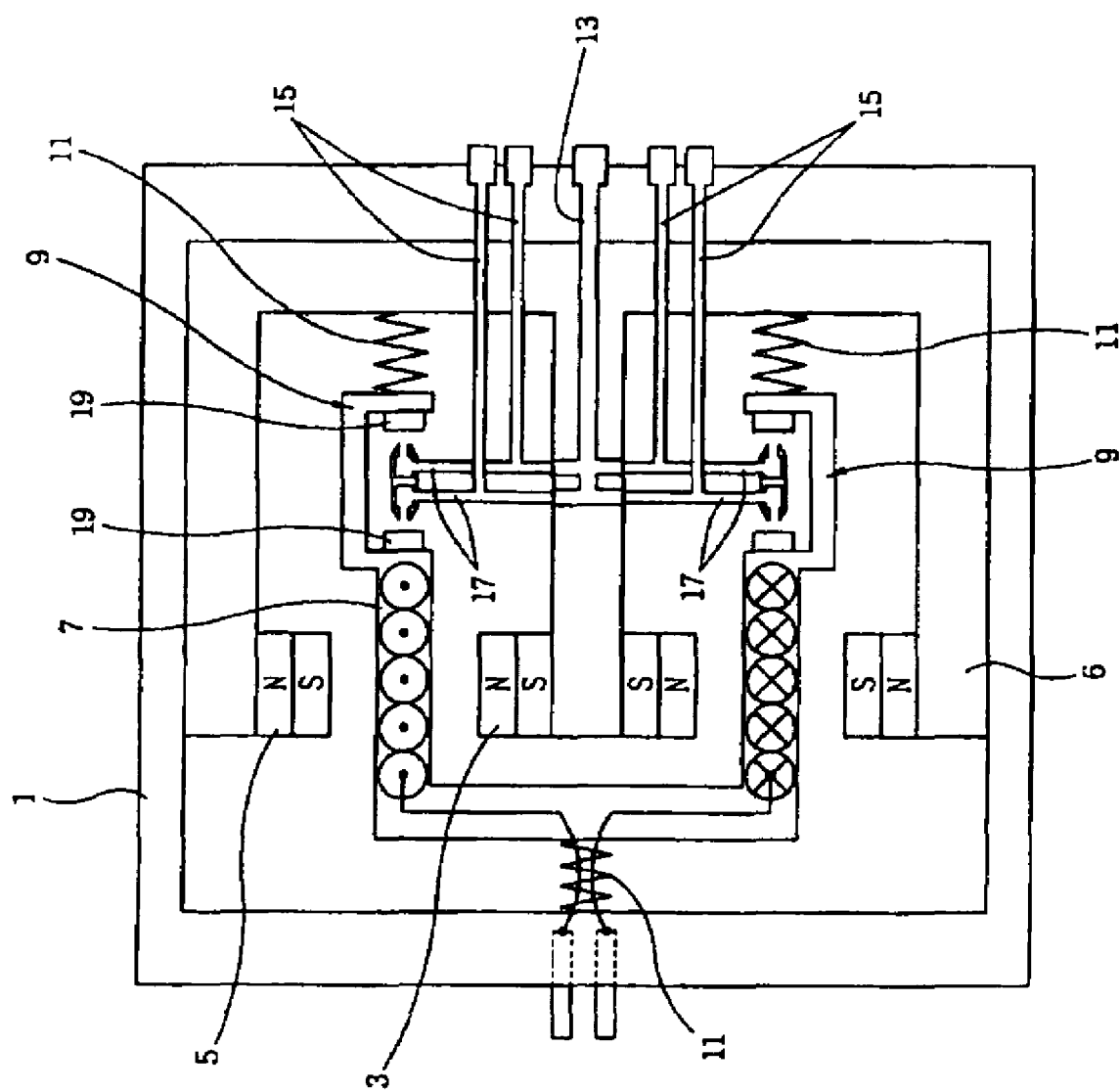
FIG. 2 is a view showing the structure of the actuator system of FIG. 1, from which a load has been removed.

Referring to FIGS. 1 and 2, a moving coil type actuator system according to an embodiment of the present invention includes a casing 1, a center magnet 3, which is provided at the center in the casing 1, a surrounding magnet 5, which surrounds the center magnet 3 at a position spaced apart from the circumferential outer surface of the center magnet 3 by a regular distance, and a coil unit 7, which is placed between the center magnet 3 and the surrounding magnet 5. The coil unit 7 causes electric current to flow in a direction perpendicular to a magnetic force line, formed by the center magnet 3 and the surrounding magnet 5, when electricity is applied to the coil unit 7. The moving coil type actuator system of the present invention further includes a flapper unit 9, which is coupled to the coil unit 7, a plurality of springs 11, which support the coil unit 7 and the flapper unit 9 in the casing 1, and a pneumatic pressure passage means, which adjusts the amount of compressed air, supplied from a compressed air source to a load, using movement of the flapper unit 9, which moves along with the coil unit 7. Flapper unit 9 acts as a fluid control valve.

Furthermore, a steel core 6 for mounting the surrounding magnet 5 is provided in the casing 1. Preferably, the steel core 6 is made of pure iron such that magnetic force can be reliably transmitted. The steel core 6 is constructed such that components of an N-pole and an S-pole are evenly distributed to linearly and normally move the actuator. Of course, elements other than the casing 1 and the coil unit 7 are made of non-magnetic material.

The springs 11 are provided both between the coil unit 7 and the casing 1 and between the flapper unit 9 and the casing 1, and elastically expand or contract in an operating direction, which is the direction in which the coil unit 7 and the flapper unit 9 are moved by elasticity supplied to the coil unit 7. Furthermore, the springs 11 support the coil unit 7 and the flapper unit 9 at front and rear positions of the operating direction.

A compressor or a compressed air tank, which is a well known technique, may be used as the compressed air source in accordance with the teachings of the present invention as set forth herein.

The pneumatic pressure passage means includes an air inlet pipe 13, through which air is supplied from the compressed air source, a pair of air outlet pipes 15, which are branched from the air inlet pipe 13 and are coupled to opposite positions of the load to apply actuating force to the load in opposite directions, and a pair of output pressure adjusting pipes 17, which are coupled to the respective air outlet pipes 15 such that the output pressure adjusting pipes 17 are selectively closed depending on movement of the flapper unit 9 in the operating direction.

In an exemplary embodiment, two flapper units 9 are respectively provided at upper and lower positions, when viewed in the drawings, and two pairs of air outlet pipes 15 and two pairs of output pressure adjusting pipes 17 are coupled to the air inlet pipe 13, so that two loads can be controlled.

As shown in the drawings, each flapper unit 9 has a U-shaped cross-section. Closing blocks 19 are provided at opposite positions in the inner surface of the flapper unit 9 to openably close openings of the output pressure adjusting pipes 17. Preferably, each closing block 19 is made of material having superior elasticity and sealing ability such that the openings of the output-pressure adjusting pipes 17 can be reliably controlled.

To correspond to the structure of the flapper unit 9, the openings of the output pressure adjusting pipes 17 are arranged in the operating direction and open in opposite directions to face the respective closing blocks 19.

In one embodiment, each load is a pneumatic cylinder 21. The air outlet pipes 15 are coupled to respective opposite ends of the pneumatic cylinder 21, thus providing actuating force in opposite directions such that the pneumatic cylinder 21 can be actuated in opposite directions.

In the moving coil type actuator system according to an embodiment of the present invention, movement of the flapper units 9 in the operating direction is controlled both depending on the direction and the intensity of electricity supplied to the coil unit 7 and depending on the time for which electricity is supplied to the coiler unit 7. Openings of the output pressure adjusting pipes 17 are selectively closed by the closing blocks 19 of the flapper units 9. Then, a difference in pneumatic pressure to be supplied to each load is created between each pair of air outlet pipes 15.

That is, compressed air is supplied from the compression air source into the air inlet pipe 13 without being interrupted, and the supplied compressed air is applied to the loads through the air outlet pipes 15. Some of the compressed air to be supplied from the air inlet pipe 13 to the load through air outlet pipes 15 is discharged through the opening of the output pressure adjusting pipe 17 which are in an open state due to the closing blocks 19.

As shown in FIG. 1, when the moving coil type actuator system of the present invention is in an initial neutral state, the openings of each pair of output pressure adjusting pipes 17 are in states of being spaced apart from the respective closing blocks 19 and thus are open. Therefore, the same amount of compressed air is applied to the loads through the air outlet pipes 15.

Figure 3:
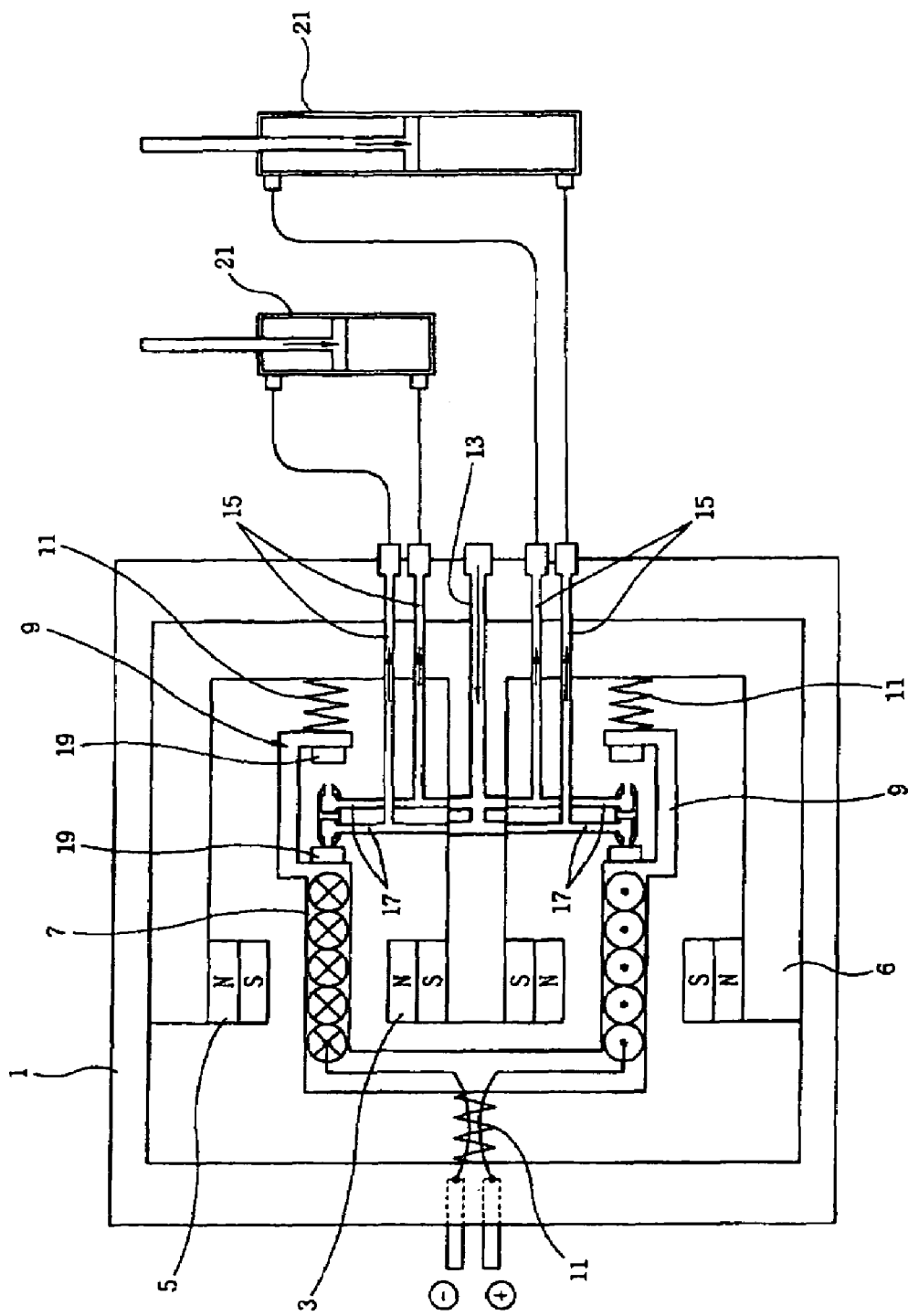
FIG. 3 is a view illustrating the operation of loads when a coil unit and a flapper unit are moved to one side, compared to when the coil unit and the flapper unit are at the initial neutral position of FIG. 1.

In the above state, when electricity is applied to the coil unit 7, the coil unit 7 is moved in the operating direction along with the flapper units 9. Then, one opening of each pair of output pressure adjusting pipes 17 is selectively closed by one closing block 19 (see, FIG. 3).

Therefore, in the case of the air outlet pipe 15 involved to the output pressure adjusting pipe 17, the opening of which is closed, compressed air is applied from the air inlet pipe 13 to the load through this air outlet pipe 15 without being discharged outside.

On the other hand, in the case of the air outlet pipe 15, communicating with the output pressure adjusting pipe 17, the opening of which is open, because some compressed air is discharged through the opening of the output pressure adjusting pipe 17, a relatively small amount of compressed air is applied to the load through this air outlet pipe 15.

As a result, different pneumatic pressures are applied to opposite ends of the load, so that the load is actuated until pneumatic pressures equilibrate with each other.

In the moving coil type actuator system of the present invention having the above-mentioned structure and operation, because the coil unit 7 and the flapper unit 9 are reliably supported by the springs 11 in the casing 1, gaps defined between the coil unit 7 and the center magnet 3 and between the coil unit 7 and the surrounding magnet 5 are maintained constant. Therefore, movability of the coil unit 7 is ensured, thus the load can be reliably linearly controlled.

Furthermore, if pneumatic pressure supplied from the compressed air source is sufficient, even a relatively large load can be precisely controlled despite very little electricity being applied to the coil unit 7 for movement of the flapper unit 9. As a result, consumption of energy required for control is markedly reduced.

The same pneumatic pressure is applied to the two closing blocks 19 of each flapper unit 9 in opposite directions, so that the sum of pneumatic pressure, which is substantially applied to the flapper unit 9, is always zero. Therefore, movement of the flapper unit 9 depends on the intensity of the electric current flowing along the coil and of a magnetic field formed by the center magnet 3 and the surrounding magnet 5, regardless of the degree of pneumatic pressure discharged through the output pressure adjusting pipes 17. There, because the intensity of the magnetic field is constant, movement of the flapper unit 9 depends only on the intensity of an electric current applied to the coil unit 7. Therefore, it is possible to precisely and smoothly control the load, even if a very large pneumatic pressure is supplied to the load from the compressed air source.

While air is described as the operative fluid in the exemplary embodiment above, other suitable and common actuating fluids may be used.

As is apparent from the foregoing, embodiments of the present invention make it possible to reliably and linearly control even a relatively large load using relatively low electric force applied to a coil unit, thus enhancing control accuracy, and preventing energy loss.

What is claimed is:

1. A moving coil type linear actuator system, comprising:
   a casing;
   a center magnet provided at a central position in the casing;
   a surrounding magnet surrounding the center magnet at a position spaced apart from the center magnet;
   a coil unit placed between the center magnet and the surrounding magnet, the coil unit providing a flow of an electric current in a direction perpendicular to a magnetic force line formed by the center magnet and the surrounding magnet, when electricity is applied to the coil unit;
   a flapper unit coupled to the coil unit;
   a plurality of springs supporting the coil unit and the flapper unit in the casing; and
   pneumatic pressure passage means for adjusting an amount of compressed air, supplied from a compressed air source to a load, using movement of the flapper unit that moves along with the coil unit.

2. The moving coil type linear actuator system as defined in claim 1, wherein the springs are provided between the coil unit and the casing and between the flapper unit and the casing and expand or contract in an operating direction, which is a direction in which the coil unit and the flapper unit are moved by the elasticity supplied to the coil unit, the springs supporting the coil unit and the flapper unit at front and rear positions of the operating direction.

3. The moving coil type linear actuator system as defined in claim 1, wherein the pneumatic pressure passage means comprises:
   an air inlet pipe, through which air is supplied from the compressed air source;
   a pair of air outlet pipes branched from the air inlet pipe and coupled to opposite positions of the load to apply actuating force to the load in opposite directions; and
   a pair of output pressure adjusting pipes coupled to the respective air outlet pipes such that the output pressure adjusting pipes are selectively closed depending on movement of the flapper unit in the operating direction.

4. The moving coil type linear actuator as defined in claim 1, wherein the surrounding magnet surrounds the center magnet at a position spaced apart from the center magnet by a regular distance.

* * * * *